United States Patent
Sjöberg et al.

(10) Patent No.: US 7,050,489 B1
(45) Date of Patent: May 23, 2006

(54) VDSL TRANSMISSION SYSTEMS

(75) Inventors: Frank Sjöberg, Luleå (SE); Sarah Kate Wilson, Luleå (SE); Rickard Nilsson, Luleå (SE); Daniel Bengtsson, Luleå (SE); Mikael Isaksson, Luleå (SE); Tomas Nordström, Luleå (SE); Per Ödling, Luleå (SE); Gunnar Bahlenberg, Luleå (SE); Magnus Johansson, Luleå (SE); Lennart Olsson, Luleå (SE); Sven-Göran Ökvist, Luleå (SE)

(73) Assignee: STMicroelectronics NV, Amsterdam (NL)

( * ) Notice: Subject to any disclaimer, the term of this patent is extended or adjusted under 35 U.S.C. 154(b) by 0 days.

(21) Appl. No.: 09/856,438

(22) PCT Filed: Nov. 18, 1999

(86) PCT No.: PCT/SE33/02116

§ 371 (c)(1),
(2), (4) Date: May 21, 2001

(87) PCT Pub. No.: WO00/31890

PCT Pub. Date: Jun. 2, 2000

(30) Foreign Application Priority Data

Nov. 21, 1998 (SE) .................................. 9804021
Mar. 5, 1999 (SE) .................................. 9900788

(51) Int. Cl.
*H04B 1/38* (2006.01)

(52) U.S. Cl. ....................................................... 375/222
(58) Field of Classification Search ............... 375/225, 375/222, 227, 228, 288, 219, 220, 377; 370/201
See application file for complete search history.

(56) References Cited

U.S. PATENT DOCUMENTS 5,887,032 A 3/1999 Cioffi
6,647,058 B1 * 11/2003 Bremer et al. ............... 375/222

FOREIGN PATENT DOCUMENTS

WO    WO 9923764 A1    5/1999

* cited by examiner

*Primary Examiner*—Young T. Tse
(74) *Attorney, Agent, or Firm*—Lisa K. Jorgenson; William R. McClellan; Wolf, Greenfield & Sacks, P.C.

(57) ABSTRACT

One problem, frequently encountered with VDSL transmission systems, is that upstream FEXT produced by system users having short wires can be very strong. Users having shorter wires get high bit rates whereas users having longer wires get low bit rates. In extreme cases it may happen that users with wire lengths greater than 1000 meter cannot transmit data upstream. The present invention provides a VDST transmission system with a plurality of modems. The modems are located at varying distances from a central station. There is a target bit rate for each modem. That modems on shorter wires have control means for reducing their transmit power. This reduces the FEXT produced by these modems enabling modems on longer wires to transmit at higher bit rates.

35 Claims, 2 Drawing Sheets

VDSL TRANSMISSION SYSTEMS

BACKGROUND OF THE INVENTION

1. Field of the Invention

The present invention relates to a VDSL transmission system in which power control is used to reduce FEXT, a modem for use in a VDSL transmission system, and a method of reducing FEXT in a VDSL transmission system by using power back-off.

2. Discussion of the Related Art

One problem, frequently encountered with VDSL transmission systems, is that upstream FEXT produced by system users having short wires can be very strong. This severely limits the performance for users with longer wires. Users having shorter wires get high bit rates whereas users having longer wires get low bit rates, or possibly a zero bit rate. In extreme cases it may happen that users with wire lengths greater than 1000 meter cannot transmit data upstream.

SUMMARY OF THE INVENTION

The present invention provides a way of overcoming this problem by using power back-off to provide a more even distribution of the available bandwidth capacity among customers with different wire lengths. Power back-off means that modems on shorter wires reduce their transmit power in order to lower the FEXT they produce. This enables modems on longer wires to obtain an acceptable bit rate.

Known techniques for reducing FEXT cannot set target bit rates for the users and cannot provide any sort of optimisation of bit rate distribution between users. The present invention gives a better performance, i.e. higher bit rates, than known techniques for reducing FEXT, especially for thinner, i.e. more lossy, wires.

According to a first aspect of the present invention, there is provided a VDSL transmission system having a plurality of modems operating on an access network in which at least some of said modems operate on wires of different lengths and in which there is a target bit rate for each modem, characterised in that modems on relatively short wires have control means for reducing their transmit power so that FEXT produced by said modems is reduced enabling modems on substantially longer wires to transmit at higher bit rates.

Said relatively short wires may be less than 1,000 meters long and said substantially longer wires are more than 1,000 meters long.

At least some of said modems may have control means adapted to distribute power over an available frequency band so that said target bit rate is achieved.

Said VDSL system may be adapted to modulate transmitted data using DMT.

The control means, associated with a given modem connected to a given wire, may be adapted to produce an energy loading for the $k^{th}$ sub-carrier given by:

$$E_k = \lambda \frac{n_k}{F_k}$$

where $n_k$ is the background noise on sub-carrier k, $F_k$ is the FEXT transfer function for said given wire and $\lambda$ is a constant, $\lambda$ being adjusted so that $$R = \sum_{k=0}^{N-1} \log_2\left(1 + \frac{E_k}{\Gamma(n_k + Fext_k)\Gamma_M}\right)$$

where $Fext_k$ is the FEXT from other VDSL modems, $\Gamma$ is the SNR-gap, $\Gamma_m$ is the system margin and R is the target bit rate per DMT frame.

Said FEXT transfer function may be given by:

$$F_k = K|H_k|^2 f_k^2 d$$

where $H_k$ is the transfer function for the given wire, $f_k$ is the frequency for subcarrier k, d is the length of the wire and K is a constant.

$E_k$ may always be less than a maximal allowable PSD-level, $PSD_{max}$, for said VDSL system.

$E_k$ may be given by:

$$E_k = \lambda \frac{n_k}{F_k} \text{ for } \lambda \frac{n_k}{F_k} < PSD_{max} \text{ and } E_k = PSD_{max} \text{ for } \lambda \frac{n_k}{F_k} \geq PSD_{max}$$

According to a second aspect of the present invention, there is provided a modem for use with a VDSL transmission system having a plurality of modems operating on an access network in which at least some of said modems operate on wires of different lengths, said modem having a target bit rate, characterised in that said modem has control means for reducing its transmit power so that FEXT produced by said modem is reduced.

Said control means may be adapted to distribute power over an available frequency band so that said target bit rate is achieved.

Said modem may be adapted to modulate transmitted data using DMT.

Said modem may be connected to a wire, and said control means may be adapted to produce an energy loading for the $k^{th}$ sub-carrier given by:

$$E_k = \lambda \frac{n_k}{F_k}$$

where $n_k$ is the background noise on sub-carrier k, $F_k$ is the FEXT transfer function for said wire and $\lambda$ is a constant, $\lambda$ being adjusted so that $$R = \sum_{k=0}^{N-1} \log_2\left(1 + \frac{E_k}{\Gamma(n_k + Fext_k)\Gamma_M}\right)$$

where $Fext_k$ is the FEXT from other VDSL modems, $\Gamma$ is the SNR-gap, $\Gamma_m$ is the system margin and R is the target bit rate per DMT frame.

Said FEXT transfer function may be given by:

$$F_k = K|H_k|^2 f_k^2 d$$

where $H_k$ is the transfer function for the given wire, $f_k$ is the frequency for subcarrier k, d is the length of the wire and K is a constant.

Ek may always be less than a maximal allowable PSD-level for VDSL.

Ek may be given by:

$$E_k = \lambda \frac{n_k}{F_k} \text{ for } \lambda \frac{n_k}{F_k} < PSD_{max} \text{ and } E_k = PSD_{max} \text{ for } \lambda \frac{n_k}{F_k} \geq PSD_{max}$$

According to a third aspect of the present invention, there is provided, in a VDSL transmission system having a plurality of modems operating on an access network in which at least some of said modems operate on wires of different lengths and in which there is a target bit rate for each modem, a method of performing power back-off, characterised by reducing the transmit power of modems on relatively short wires so that FEXT produced by said modems is reduced enabling modems on substantially longer wires to transmit at higher bit rates.

Said relatively short wires may be less than 1,000 meters long and said substantially longer wires may be more than 1000 meters long.

Power may be distributed over an available frequency band so that said target bit rate is achieved.

Transmitted data may be modulated using DMT.

An energy loading for the $k^{th}$ sub-carrier given by:

$$E_k = \lambda \frac{n_k}{F_k}$$

where $n_k$ is the background noise on sub-carrier k, $F_k$ is the FEXT transfer function for said given wire and $\lambda$ is a constant which is adjusted so that $$R = \sum_{k=0}^{N-1} \log_2\left(1 + \frac{E_k}{\Gamma(n_k + Fext_k)\Gamma_M}\right)$$

where $Fext_k$ is the FEXT from other VDSL modems, $\Gamma$ is the SNR-gap, $\Gamma_m$ is the system margin and R is the target bit rate per DMT frame, may be produced.

Said FEXT transfer function may be given by:

$$F_k = K|H_k|^2 f_k^2 d$$

where $H_k$ is the transfer function for the given wire, $f_k$ is the frequency for sub-carrier k, d is the length of the wire and K is a constant.

$E_k$ may always be less than a maximal allowable PSD-level, $PSD_{max}$, for said VDSL system.

Ek may be given by:

$$E_k = \lambda \frac{n_k}{F_k} \text{ for } \lambda \frac{n_k}{F_k} < PSD_{max} \text{ and } E_k = PSD_{max} \text{ for } \lambda \frac{n_k}{F_k} \geq PSD_{max}$$

Embodiments of the invention will now be described, by way of example, with reference to the accompanying drawings, in which:

DETAILED DESCRIPTION

Figure 1:
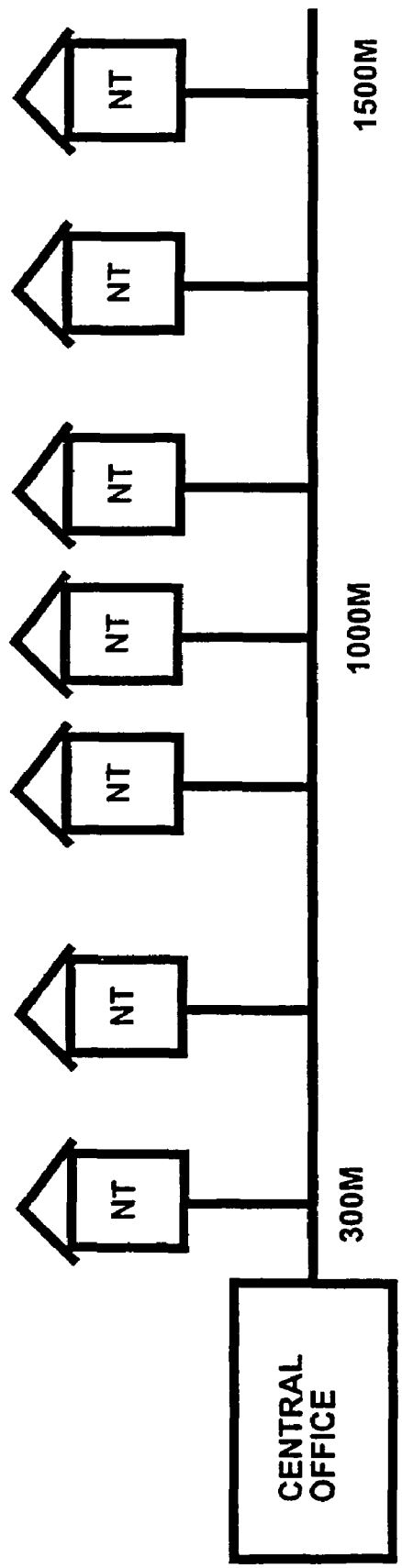
FIG. 1 illustrates a telephone access network in which the present invention may be implemented.

A glossary of the abbreviations used in this patent specification is set out below to aid the reader:
DMT: Discrete Multi Tone
FEXT: Far-End Cross Talk
PSD: Power Spectral Density
SNR: Signal to Noise Ratio
VDSL: Very high rate Digital Subscriber Line A typical telephone access network, suitable for use with a VDSL transmission system is shown in FIG. 1. It will be seen that network terminals, NT, are located at a variety of distances from the central station, typically between 300 m and 1,500 m. Because of the FEXT produced by network terminals located close to the central station, the more remote terminals, further than 1,000 m from the central station, may have little useable bandwidth available to them, i.e. they will only be able to transmit data in the upstream direction at low bit rates.

The present invention provides a method of performing power back-off in a VDSL modem, which may be located in any of the network terminals shown in FIG. 1. Consider a VDSL modem operating in the access network of FIG. 1, on a wire of a given length, where several other modems operate on wires of different lengths. Some of the wire lengths may be longer and others may be shorter and yet others of the same length. The modem has a target bit rate assigned to it and the power is distributed over the frequency band in such a manner that the target bit rate can be achieved. The power distribution is made in such a way that the bit rates of other modems, connected to the same access network, are maximised.

Consider, as an example, a VDSL system employing DMT and let $E_k$ denote the transmit energy or energy loading to be used on sub-carrier k. If a target bit rate of R bits per DMT frame is to be achieved, the following constraint on the energies $E_k$ exist:

$$R = \sum_{k=0}^{N-1} \log_2\left(1 + \frac{E_k}{\Gamma(n_k + Fext_k)\Gamma_M}\right) \quad (1)$$

where $n_k$ is the background noise on sub-carrier k, $Fext_k$ is the FEXT from other VDSL modems, $\Gamma$ is the SNR-gap (=9.8 dB), $\Gamma_m$ is the system margin (typically 3–6 dB). To maximise the bit rate for the other VDSL modems, the energy on the $k^{th}$ sub-carrier should be:

$$E_k = \lambda \frac{n_k}{F_k} \quad (2)$$

where $\lambda$ is a constant that is adjusted so that equation (1) is fulfilled, and $F_k$ is the FEXT transfer function for the wire under consideration. The FEXT transfer function can be calculated from:

$$F_k = K|H_k|^2 f_k^2 d \quad (3)$$

where $H_k$ is the transfer function for the given wire, $f_k$ is the frequency for subcarrier k, d is the length of the wire and K is a constant. K and d are of no great importance since they are subsumed in $\lambda$. By using equation (2) to set the energy distribution, the FEXT will be spectrally shaped in the same way as the background noise.

Another constraint, that must always be applied, is that $E_k$ must never exceed the maximum allowable PSD-level for VDSL, i.e. $PSD_{max}$. This means that equation (2) can be rewritten as:

$$E_k = \lambda \frac{n_k}{F_k} \text{ for } \lambda \frac{n_k}{F_k} < PSD_{max}$$

$$E_k = PSD_{max} \text{ for } \lambda \frac{n_k}{F_k} \geq PSD_{max}$$

If too large a value of R is chosen, then it may happen that $E_k = PSD_{max}$ for all k without achieving the target bit rate.

Figure 2:
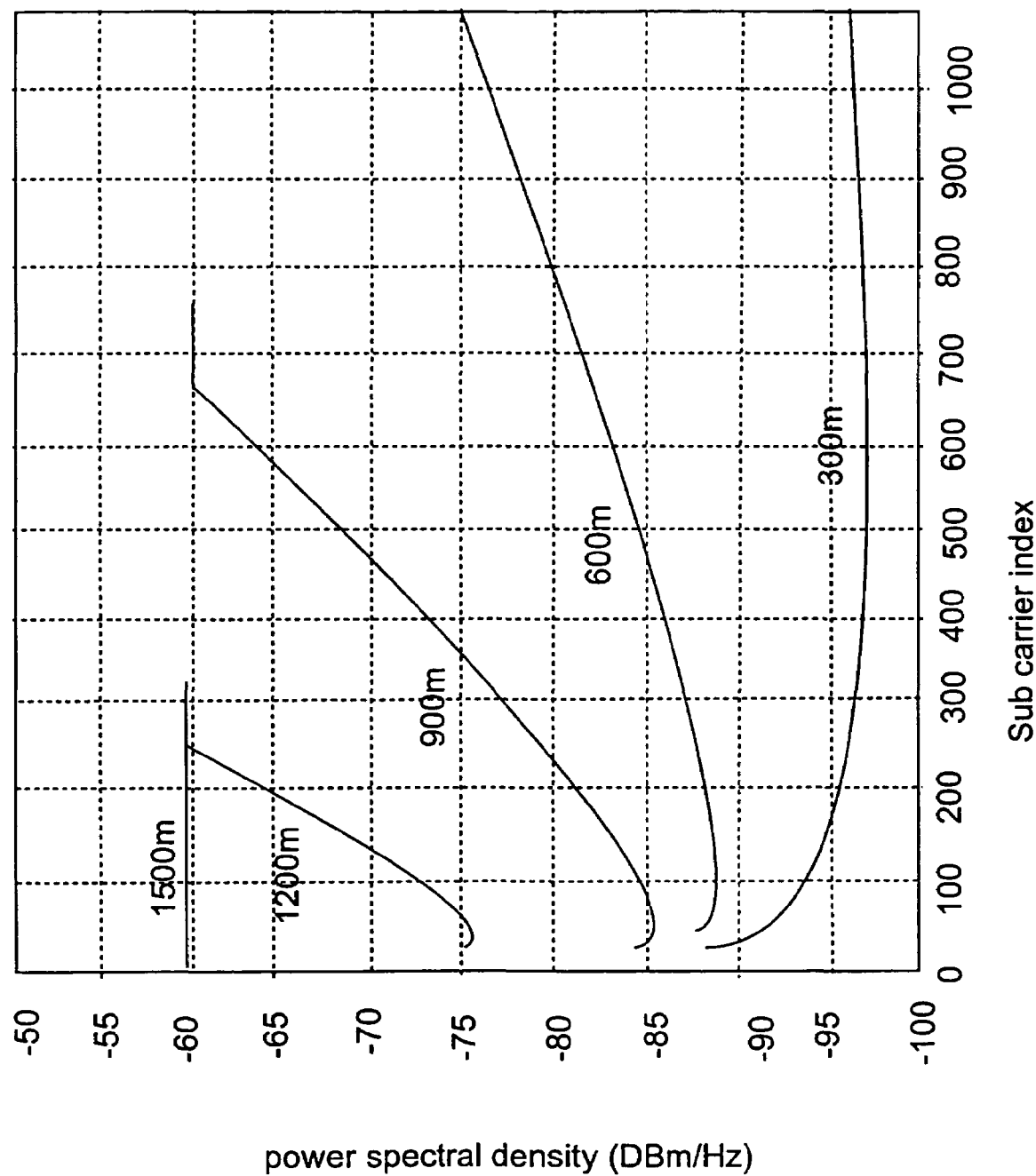
FIG. 2 illustrates the way in which PSD varies for different wire lengths.

FIG. 2 shows an example of how the PSD looks for different wire lengths. Shorter wires use lower transmit powers and tend to load more power on the higher frequencies than on the lower frequencies. Since the longer wires can only use the lower frequencies, it seems intuitive to let the short wires use the higher frequencies and save the lower frequencies for the longer wires.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

We claim:

1. For a very high rate digital subscriber line transmission system having a plurality of modems operating on an access network in which at least some of said modems operate on wires of different lengths and in which there is a target bit rate for each modem, a method of redistributing available bandwidth which includes reducing the transmit power of modems on relatively short wires so that far-end cross talk produced by said modems is reduced, enabling modems on substantially longer wires to transmit at higher bit rates, the method further including producing, in each of at least some of said modems, an energy loading $E_k$ for a $k^{th}$ sub-carrier given by:

$$E_k = \lambda \frac{n_k}{F_k}$$

where $n_k$ is the background noise on the $k^{th}$ sub-carrier, $F_k$ is a far-end cross talk transfer function for a given wire and $\lambda$ is a constant, $\lambda$ being adjusted so that $$R = \sum_{k=0}^{N-1} \log_2 \left(1 + \frac{E_k}{\Gamma(n_k + Fext_k)\Gamma_M}\right)$$

where $Fext_k$ is a far-end cross talk from other very high rate digital subscriber line modems, $\Gamma$ is a signal to noise ratio-gap, $\Gamma_M$ is a system margin and R is a target bit rate per discrete multitone frame.

2. A method as claimed in claim 1, wherein said relatively short wires are less than or equal to 1,000 meters long, and wherein said substantially longer wires are more than 1,000 meters long.

3. A method as claimed in claim 1, including distributing power over an available frequency band so that said target bit rate is achieved.

4. A method as claimed in claim 1, including the modems modulating transmitted data using discrete multitone.

5. A method as claimed in claim 1, wherein said far-end cross talk transfer function $F_k$ is given by:

$$F_k = K|H_k|^2 f_k^2 d$$

where $H_k$ is a transfer function for the given wire, $f_k$ is a frequency for the $k^{th}$ sub-carrier, d is a length of the given wire and K is a constant.

6. A method as claimed in claim 1, wherein $E_k$ is always less than a maximum allowable power spectral density-level, $PSD_{max}$ for said very high rate digital subscriber line transmission system.

7. A method as claimed in claim 6, wherein:

$$E_k = \lambda \frac{n_k}{F_k} \text{ for } \lambda \frac{n_k}{F_k} < PSD_{max}; \text{ and}$$

$$E_k = PSD_{max} \text{ for } \lambda \frac{n_k}{F_k} \geq PSD_{max}.$$

8. For a very high rate digital subscriber line transmission system having a plurality of modems operating on an access network in which at least some of said modems operate on wires of different lengths and in which there is a target bit rate for each modem, a method of constraining transmission energy of at least one modem on a relatively short wire, by applying power back-off so as to force said transmission energy loading toward said target bit rate, in order to reduce far-end cross talk produced by said at least one modem, enabling modems on substantially longer wires to transmit at higher bit rates, the method further including producing, in each of at least some of said modems, an energy loading $E_k$ for a $k^{th}$ sub-carrier given by:

$$E_k = \lambda \frac{n_k}{F_k}$$

where $n_k$ is the background noise on the $k^{th}$ sub-carrier, $F_k$ is a far-end cross talk transfer function for a given wire and $\lambda$ is a constant, $\lambda$ being adjusted so that $$R = \sum_{k=0}^{N-1} \log_2 \left(1 + \frac{E_k}{\Gamma(n_k + Fext_k)\Gamma_M}\right)$$

where $Fext_k$ is a far-end cross talk from other very high rate digital subscriber line modems, $\Gamma$ is a signal to noise ratio-gap, $\Gamma_M$ is a system margin and R is a target bit rate per discrete multitone frame.

9. A method as claimed in claim 8, wherein said far-end cross talk transfer function $F_k$ is given by:

$$F_k = K|H_k|^2 f_k^2 d$$

where $H_k$ is a transfer function for the given wire, $f_k$ is a frequency for the $k^{th}$ sub-carrier, d is a length of the given wire and K is a constant.

10. A method as claimed in claim 8, wherein $E_k$ is always less than a maximum allowable power spectral density-level, $PSD_{max}$ for said very high rate digital subscriber line transmission system.

11. A method as claimed in claim 10, wherein:

$$E_k = \lambda \frac{n_k}{F_k} \text{ for } \lambda \frac{n_k}{F_k} < PSD_{\max}; \text{ and } E_k = PSD_{\max} \text{ for } \lambda \frac{n_k}{F_k} \geq PSD_{\max}.$$

12. A very high rate digital subscriber line transmission system, comprising:
   a station;
   a first modem connected to the station with a wire; and
   a second modem connected to the station with a wire, and comprising a means for controlling transmission output to approach a target bit rate to effectively distribute overall system bandwidth, said means for controlling transmission adapted to produce an energy loading $E_k$ for a $k^{th}$ sub-carrier given by:

$$E_k = \lambda \frac{n_k}{F_k}$$

where $n_k$ is the background noise on the $k^{th}$ sub-carrier, $F_k$ is a far-end cross talk transfer function for a given wire and $\lambda$ is a constant, $\lambda$ being adjusted so that $$R = \sum_{k=0}^{N-1} \log_2 \left(1 + \frac{E_k}{\Gamma(n_k + Fext_k)\Gamma_M}\right)$$

where $Fext_k$ is a far-end cross talk from other very high rate digital subscriber line modems, $\Gamma$ is a signal to noise ratio-gap, $\Gamma_M$ is a system margin and R is a target bit rate per discrete multitone frame.

13. The system as claimed in claim 12, wherein the means for controlling transmission output utilizes a relatively short wire to access the system.

14. The system as claimed in claim 13, wherein the relatively short wire is a wire less than or equal to 1000 meters long.

15. The system as claimed in claim 12, wherein the first modem utilizes a relatively long wire to access the system.

16. The system as claimed in claim 15, wherein the relatively long wire is a wire more than 1000 meters long.

17. The system as claimed in claim 12, wherein the means for controlling transmission output reduces far-end crosstalk.

18. The system as claimed in claim 12, wherein said far-end cross talk transfer function $F_k$ is given by:

$$F_k = K|H_k|^2 f_k^2 d$$

where $H_k$ is a transfer function for the given wire, $f_k$ is a frequency for the $k^{th}$ sub-carrier, d is a length of the given wire and K is a constant.

19. The system as claimed in claim 12, wherein $E_k$ always less than a maximum allowable power spectral density-level, $PSD_{max}$ for said very high rate digital subscriber line transmission system.

20. The system, as claimed in claim 19 wherein:

$$E_k = \lambda \frac{n_k}{F_k} \text{ for } \lambda \frac{n_k}{F_k} < PSD_{\max}; \text{ and } E_k = PSD_{\max} \text{ for } \lambda \frac{n_k}{F_k} \geq PSD_{\max}.$$

21. A very high rate digital subscriber line transmission system having a plurality of modems operating on an access network in which at least some of said modems operate on wires of different lengths and in which there is a target bit rate for each modem, wherein each of at least some of said modems include a control means for controlling transmission adapted to produce an energy loading for a $k^{th}$ sub-carrier given by:

$$E_k = \lambda \frac{n_k}{F_k}$$

where $n_k$ is the background noise on the $k^{th}$ sub-carrier, $F_k$ is a far-end cross talk transfer function for a wire the modem is connected to, and $\lambda$ is a constant adjusted so that $$R = \sum_{k=0}^{N-1} \log_2 \left(1 + \frac{E_k}{\Gamma(n_k + Fext_k)\Gamma_M}\right)$$

where $Fext_k$ is a far-end cross talk from other very high rate digital subscriber line modems, $\Gamma$ is a signal to noise ratio-gap, $\Gamma_M$ is a system margin and R is a target bit rate per discrete multitone frame.

22. A very high rate digital subscriber line transmission system as claimed in claim 21, wherein said system is adapted to modulate transmitted data using discrete multitone.

23. A very high rate digital subscriber line transmission system as claimed in claim 21, wherein said far-end cross talk transfer function is given by:

$$F_k = K|H_k|^2 f_k^2 d$$

where $H_k$ is a transfer function for a given wire, $f_k$ is a frequency for the $k^{th}$ sub-carrier, d is the length of the given wire and K is a constant.

24. A very high rate digital subscriber line transmission system as claimed in claim 23, wherein $E_k$ is always less than a maximum allowable power spectral density-level, $PSD_{max}$, for said very high rate digital subscriber line transmission system.

25. A very high rate digital subscriber line transmission system as claimed in claim 24, wherein:

$$E_k = \lambda \frac{n_k}{F_k} \text{ for } \lambda \frac{n_k}{F_k} < PSD_{\max}; \text{ and } E_k = PSD_{\max} \text{ for } \lambda \frac{n_k}{F_k} \geq PSD_{\max}.$$

26. A very high rate digital subscriber line transmission system as claimed in claim 21, wherein $E_k$ is always less than a maximum allowable power spectral density-level, $PSD_{max}$, for said very high rate digital subscriber line transmission system.

27. A very high rate digital subscriber line transmission system as claimed in claim 26, wherein:

$$E_k = \lambda \frac{n_k}{F_k} \text{ for } \lambda \frac{n_k}{F_k} < PSD_{\max}; \text{ and } E_k = PSD_{\max} \text{ for } \lambda \frac{n_k}{F_k} < PSD_{\max}.$$

28. A modem for use with a very high rate digital subscriber line transmission system having a plurality of modems said modem having a target bit rate, wherein the modem includes a control mean for controlling transmission adapted to produce an energy loading for a $k^{th}$ sub-carrier given by:

$$E_k = \lambda \frac{n_k}{F_k}$$

where $n_k$ is the background noise on the $k^{th}$ sub-carrier, $F_k$ is a far-end cross talk transfer function for a wire the modem is connected to, and $\lambda$ is a constant adjusted so that $$R = \sum_{k=0}^{N-1} \log_2\left(1 + \frac{E_k}{\Gamma(n_k + Fext_k)\Gamma_M}\right)$$

where $Fext_k$ is a far-end cross talk from other very high rate digital subscriber line modems, $\Gamma$ is a signal to noise ratio-gap, $\Gamma_M$ is a system margin and R is a target bit rate per discrete multitone frame.

29. In a very high rate digital subscriber line transmission system having a plurality of modems operating on an access network in which at least some of said modems operate on wires of different lengths and in which there is a target bit rate for each modem, a method of performing power back-off, wherein modems on shorter wires reduce their transmitting power in order to lower the far-end crosstalk they produce, by producing an energy loading of a $k^{th}$ sub-carrier given by:

$$E_k = \lambda \frac{n_k}{F_k}$$

where $n_k$ is the background noise on the $k^{th}$ sub-carrier, $F_k$ is a far-end cross talk transfer function for a corresponding wire, and $\lambda$ is a constant which is adjusted so that $$R = \sum_{k=0}^{N-1} \log_2\left(1 + \frac{E_k}{\Gamma(n_k + Fext_k)\Gamma_M}\right)$$

where $Fext_k$ is a far-end cross talk from other very high rate digital subscriber line modems, $\Gamma$ is a signal to noise ratio-gap, $\Gamma_M$ is a system margin and R is a target bit rate per discrete multitone frame.

30. A method as claimed in claim 29, wherein data transmitted by the modems is modulated using discrete multitone.

31. A method as claimed in claim 29, wherein said far-end cross talk transfer function is given by:

$$F_k = K|H_k|^2 f_k^2 d$$

where $H_k$ is a transfer function for a given wire, $f_k$ is a frequency for the $k^{th}$ sub-carrier, d is a length of the given wire and K is a constant.

32. A method as claimed in claim 31, wherein $E_k$ is always less than a maximum allowable power spectral density-level, $PSD_{max}$, for said very high rate digital subscriber transmission line system.

33. A method as claimed in claim 32, wherein:

$$E_k = \lambda \frac{n_k}{F_k} \text{ for } \lambda \frac{n_k}{F_k} < PSD_{max}; \text{ and } E_k = PSD_{max} \text{ for } \lambda \frac{n_k}{F_k} \geq PSD_{max}.$$

34. A method as claimed in claim 29, wherein $E_k$ is always less than a maximum allowable power spectral density-level, $PSD_{max}$, for said very high rate digital subscriber line transmission system.

35. A method as claimed in claim 34, wherein:

$$E_k = \lambda \frac{n_k}{F_k} \text{ for } \lambda \frac{n_k}{F_k} < PSD_{max}; \text{ and } E_k = PSD_{max} \text{ for } \lambda \frac{n_k}{F_k} \geq PSD_{max}.$$

* * * * *

UNITED STATES PATENT AND TRADEMARK OFFICE
CERTIFICATE OF CORRECTION

PATENT NO. : 7,050,489 B1
APPLICATION NO. : 09/856438
DATED : May 23, 2006
INVENTOR(S) : Frank Sjöberg et al.

It is certified that error appears in the above-identified patent and that said Letters Patent is hereby corrected as shown below:

On the title page, item (75) should read:
(75) Inventors: Frank Sjöberg; Luleå, (SE);
Sarah Kate Wilson, CA (US)
Richard Nilsson, Luleå, (SE);
Daniel Bengtsson, Luleå, (SE);
Mikael Isaksson; Luleå, (SE);
Tomas Nordström; Luleå, (SE);
Per Ödling; Luleå, (SE);
Gunnar Bahlenberg; Luleå, (SE);
Magnus Johansson; Luleå, (SE);
Lennart Olsson; Luleå, (SE);
Sven-Göran Ökvist; Luleå, (SE);

On the title page, item (86) should read:
(86) PCT No.: PCT/SE99/02116

Signed and Sealed this

Twenty-second Day of August, 2006

JON W. DUDAS
*Director of the United States Patent and Trademark Office*